United States Patent
Blue

[15] 3,668,961
[45] June 13, 1972

[54] PORTABLE BAND SAW

[72] Inventor: Donald E. Blue, 1717 6th Street, N.W., Albuquerque, N. Mex. 87102

[22] Filed: Dec. 30, 1969

[21] Appl. No.: 889,077

[52] U.S. Cl. .............. 83/201.04, 83/201.15, 143/17 A, 143/19 E, 143/26 A, 143/160 E, 143/160 F
[51] Int. Cl. .......................................... B26d 1/46
[58] Field of Search .............. 143/17, 17 A, 19, 19 D, 19 E, 143/26, 26 A, 26 B, 31, 160, 160 E, 160 F, 162, 165; 83/201, 201.03, 201.04, 201.15

[56] References Cited

UNITED STATES PATENTS

| | | | |
|---|---|---|---|
| 3,518,909 | 7/1970 | Blue | 143/17 R X |
| 2,628,644 | 2/1953 | Elbon | 143/19 B UX |
| 836,446 | 11/1906 | Kaudela | 143/160 E |

FOREIGN PATENTS OR APPLICATIONS

| | | | |
|---|---|---|---|
| 608,767 | 9/1948 | Great Britain | 143/19 D |
| 56,029 | 12/1940 | Norway | 143/162 |
| 717,342 | 8/1931 | France | 143/162 |
| 107,985 | 3/1927 | Austria | 149/19 E |

Primary Examiner—Andrew R. Juhasz
Assistant Examiner—James F. Coan
Attorney—Jacobi, Davidson & Kleeman

[57] ABSTRACT

There is disclosed a portable band saw having a travelling band cooperating with pulleys so located that the front and rear band portions are positioned in relatively close but spaced relationship. The pulleys rotate parallel axes. Longitudinally spaced guide means are incorporated which cooperate respectively with the front and rear portions of the band so that, with adjustment, the guide means cause the band to be disposed with the rear portion in desired alignment with the front portion, thus permitting the portable band saw to selectively make either straight or angular cuts.

15 Claims, 7 Drawing Figures

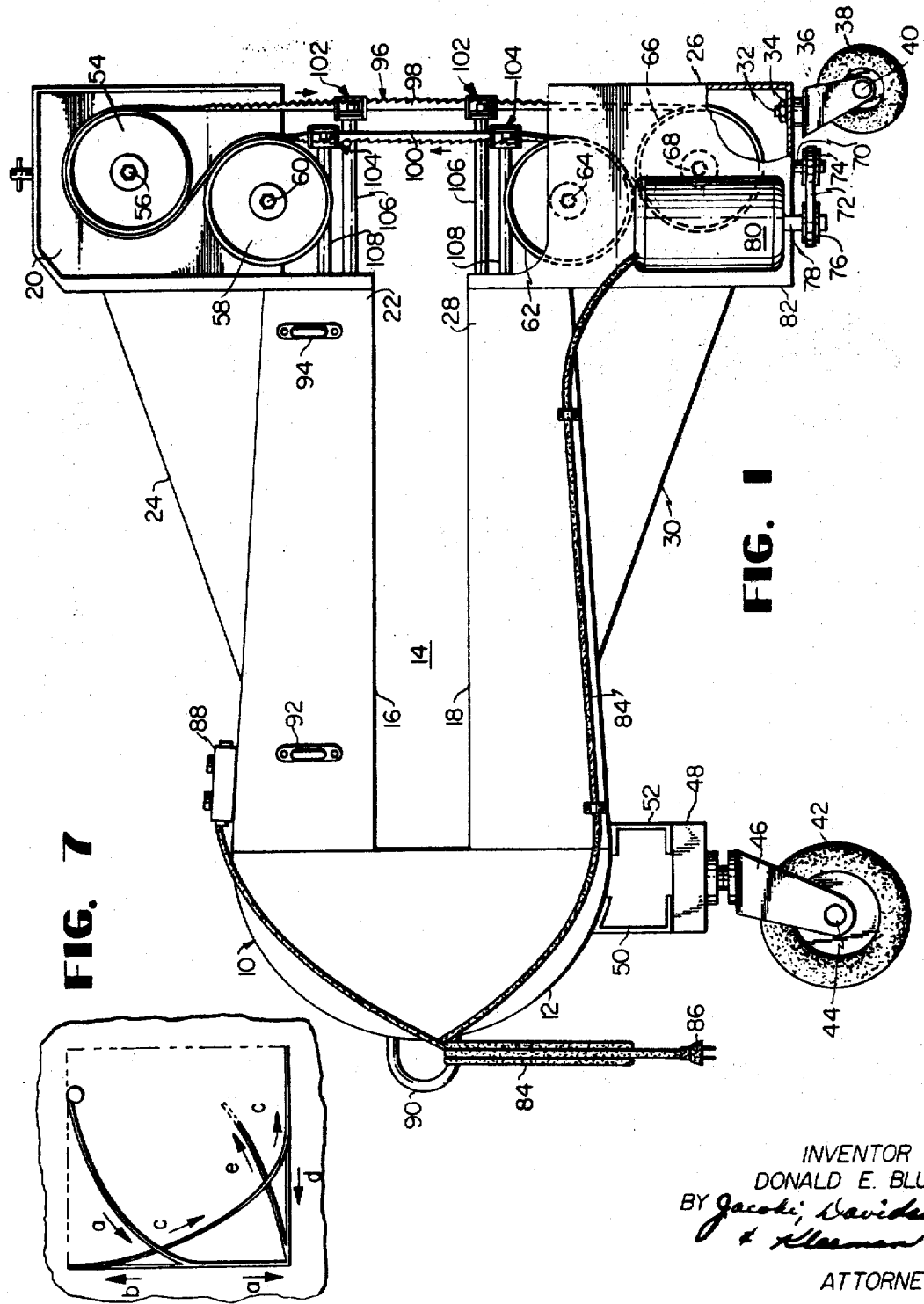

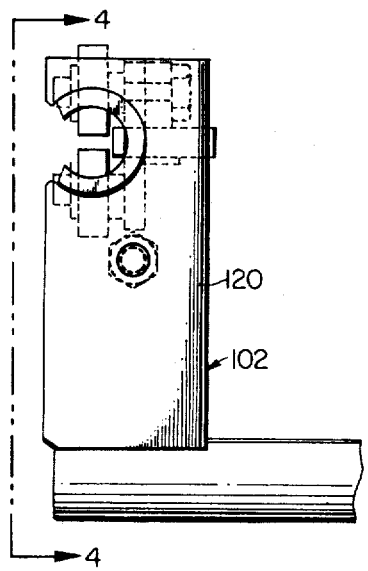
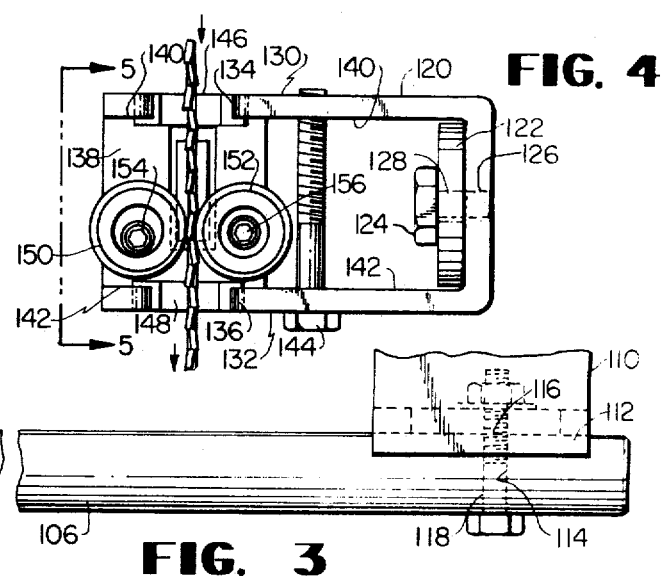
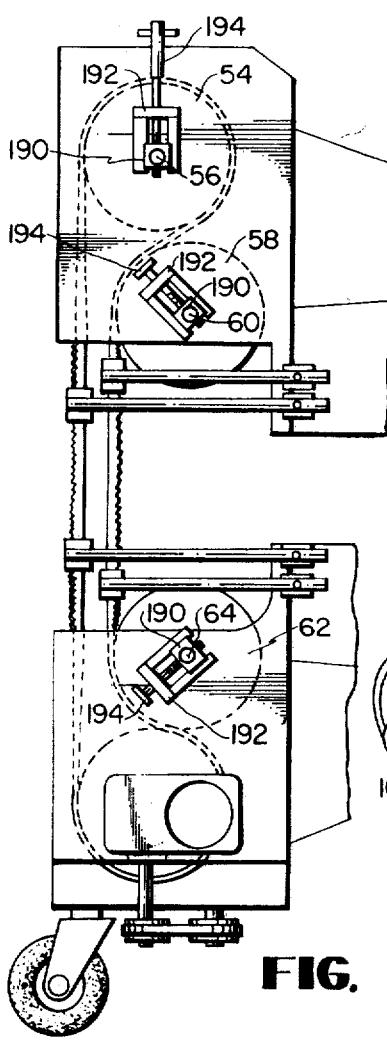
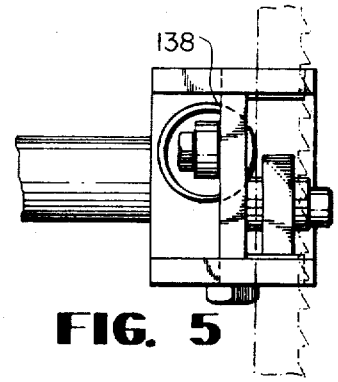
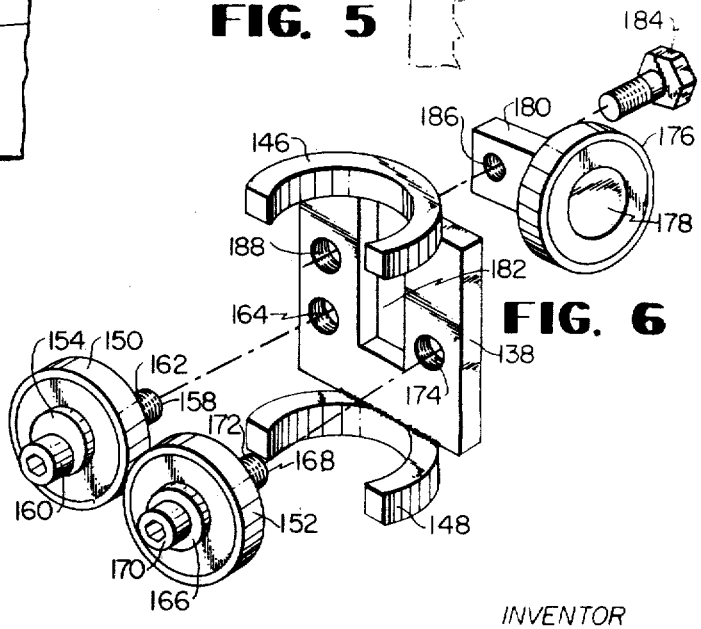

PORTABLE BAND SAW

The present invention relates to portable band saws and particularly to portable band saws in which the front and rear traveling portions of the band are positioned in close proximity to each other so that the portable band saw may be moved into the stock or the stock moved into the traveling portions of the saw band, in a manner to cut along straight lines or arcs and circles, and constitutes a substantial advance over portable band saws such as disclosed in my prior application Ser. No. 672,212, filed Oct. 2, 1967, and now U.S. Pat. No. 3,518,909.

In the portable band saw of my prior application, the downwardly traveling portions of the saw band are spaced a substantial distance apart and are guided so that they lie in the same vertical plane since the band saw was designed for making straight cuts in stock material. Thus, the moving portion of the saw band at the rear of the portable band saw enters into the cut previously made by the forwardly traveling portion of the saw band. In order to insure that the traveling portion of the saw band at the rear of the portable band saw entered the cut made by the forwardly traveling portion of the saw band, a longitudinal rearwardly extending material guide element was provided and positioned to lie in the same plane as the upwardly and downwardly traveling portions of the saw band. Although the portable band saw described in my previously filed application constituted an important advance over prior band saw constructions and overcame many of the problems encountered when it was found necessary to cut pieces of material from a sheet of stock in which such pieces of material had both dimensions less than either of the dimensions of such sheet of stock, there still remained other deficiencies that have been overcome, for the most part, by the present invention. For example, because of the distance that exists between the upwardly and downwardly traveling portions of the saw band of my prior portable band saw, as well as the presence of a longitudinal rearwardly extending material guide element, it has not been possible to move portable band saws or stock material in a manner to cut arcs or circles in the stock material, particularly when the arcs or circles to be cut in the stock material have a small radius.

Taking into consideration the foregoing deficiencies, it is the primary object of the present invention to provide a portable band saw that is so constructed that it may upon being moved into a sheet of stock material or by feeding a piece of stock material to it, cut an arc or a circle having a small radius in such sheet of stock material.

An important object of the invention is to provide a band saw that includes means that enable at least one of the moving bands of the band saw to be canted in such a manner that it is possible to cut an arc or a circle of very small radius in a sheet of stock material.

Still another object of the invention is to provide means for guiding the upwardly and downwardly traveling portions of the saw band so that said portions may be adjusted to lie at an angle to each other, with the backs of the upwardly and downwardly traveling portions facing each other, or with the fronts of the upwardly and downwardly traveling portions of the blade facing in the same direction.

Yet another object of the invention is to locate one or more support wheels on the frame of the saw directly below the area in which the saw band cuts in order to properly counteract any forces developed by a cutting operation that would tend to cause a tilting of the saw.

Another object of the invention is to provide a portable band saw in which means to effect canting of the saw band includes adjustable guide assemblies that are so associated with the upwardly traveling portion of the saw band and with the downwardly traveling portion of the saw band that they are capable of canting either of said upwardly and downwardly traveling portions of the saw band with respect to the other or of canting both traveling portions.

A further object of the invention is to provide a roller means mounted on a saw band guide assembly in such a manner that it engages the back of a traveling portion of the saw band and acts as a support for the back of the band.

A still further object of the invention is to provide roller means on longitudinally spaced guide assemblies in such a manner that they engage the back of the downwardly traveling portion of the saw band at spaced points and act as spaced supports for the back of the downwardly traveling portion of the saw band.

Yet a further object of the invention is to provide roller means on longitudinally spaced guide assemblies in such a manner that they engage the back of the upwardly traveling portion of the saw band at spaced points and act as spaced supports for the back of the upwardly traveling portion of the saw band.

An additional object of the invention is to provide roller means on the longitudinally spaced guide assemblies in such a manner that they engage the back of the downwardly and upwardly traveling portions of the saw band at spaced points and act as spaced supports for the upwardly as well as the downwardly traveling portions of the saw band.

An additional object of the invention is to provide a portable band saw according to the teachings of the present invention which is simple in construction, durable and made of material of relatively low cost.

The invention will be better understood, and objects other than those set forth above will become apparent, after reading the following detailed description thereof. Such description refers to the annexed drawings presenting preferred and illustrative embodiments of the invention.

IN THE DRAWINGS

FIG. 1 is a side elevational view of a portable band saw in accordance with the present invention;

FIG. 2 is a partial side elevational view of the portable band saw illustrated in FIG. 1 but viewed from the side of the band saw opposite to that shown in FIG. 1;

FIG. 3 is a top plan view of an adjustable guide assembly;

FIG. 4 is a side view of an adjustable guide assembly viewed in the direction of arrows 4—4 of FIG. 3;

FIG. 5 is an end view of an adjustable guide assembly viewed in the direction of arrows 5—5 of FIG. 4;

FIG. 6 is an exploded view of the adjustable guide assembly; and

FIG. 7 is a schematic view illustrating the manner in which two adjoining cuts are made in a sheet of stock when cutting a rectangular shape therefrom.

DESCRIPTION OF THE PREFERRED EMBODIMENT

Referring to the drawings it will be noted that the portable band saw disclosed therein includes an elongated frame body indicated generally by the reference number 10. The frame body is formed with an end or terminal section 12 that closes the end of a space 14 that lies between a pair of leg members 16 and 18 that extend forwardly from end section 12.

An upper pulley supporting structure 20 is secured at the forward end 22 of leg member 16 and this supporting structure 20 is made rigid by means of a bracing member 24 that is welded to, or otherwise fixedly secured between, upper pulley supporting structure 20 and the upper side of forwardly extending leg member 16.

A lower pulley supporting structure 26 is secured at the forward end 28 of the leg member 18 in any suitable manner. Pulley supporting structure 26 is made rigid by means of a bracing member 30 that is likewise welded to, or otherwise fixedly secured between, lower pulley supporting structure 26 and the lower side of the forwardly extending leg member 18.

Extending downwardly and forwardly from pulley supporting structure 26 and secured thereto by a threaded stud 32 and nut 34 is a pair of wheel support arms 36, 36 (only one of which can be seen in the drawings). Wheels 38, 38 (only one of which is shown in the drawings) are mounted on an axle 40 that is supported by support arms 36, 36. Threaded stud 32 lies in a vertical plane that substantially passes through the downwardly traveling portion 98 of the saw band 96. In fact, axle 40, supporting wheel 38, lies in a vertical plane that is forward of the vertical plane that passes through the downwardly traveling portion 98 of saw band 96. As a result of this construction, tilting of the saw during a cutting operation is eliminated.

A guide wheel 42 is mounted on guide wheel axle 44 that is carried by a fork member 46 that, in turn, is rotatably supported by a rotatable support mechanism 48. The rotatable support mechanism 48 is suspended from the terminal or end section 12 by a pair of hanger straps or brackets 50, 52.

A main upper idler pulley 54 is mounted on an axle 56 carried by the upper supporting pulley structure 20. A secondary or upper idler pulley 58 is similarly mounted on pulley supporting structure 20 by an axle 60.

The lower pulley supporting structure 26 that is suspended from the forward end 28 of leg 18 is provided with a lower idler pulley 62 mounted on an axle 64 and a drive pulley 66 that is mounted on an axle 68 and driven by a pulley drive shaft 70. The pulley drive shaft 70 is driven by a belt 72 actuated pulley 74. The belt 72 is, in turn, driven by a pulley 76 which is keyed to a shaft 78 of an electric motor 80 that is mounted on a platform 82 which is secured to and extends from the lower end of pulley support structure 26. The electric motor 80 is provided with a cable 84 that terminates in a male electric plug 86 for supplying electric power to electric motor 80. An electric off and on switch 88 is provided intermediate the ends of the electric power supplying cable 84. The switch may be located in any convenient place and in the drawings is shown as mounted on the upper surface of leg member 16.

Hand hold members, such as 90 located on the terminal or end section 12 may be provided for moving the portable band saw from place to place. Additional hand hold members 92 and 94 may be provided on the side of leg member 16 to assist in moving the portable band saw.

An endless band 96 is arranged to extend around upper main idler pulley 54, upper secondary idler pulley 58, lower idler pulley 62 and drive pulley 66. Thus, the saw band 96 will be provided with a downwardly traveling or leading front portion 98 and an upwardly traveling or rear trailing portion 100.

The idler pulleys 58 and 62 are positioned with respect to the idler 54 and drive pulley 66 so as to close the distance between the downwardly traveling or leading front portion 98 and the upwardly traveling or rear trailing portion 100 of the saw band 96.

Referring now to FIGS. 2 to 6, inclusive, of the drawings, there is shown therein adjustable saw band guide assemblies for guiding both the leading and trailing sections of the saw band 96 which are indicated generally by reference numerals 102, 104, respectively. As will be apparent on referring to FIG. 1 of the drawings, there are two longitudinally spaced guide assemblies 102 for the leading section of the saw band 96 and two longitudinally spaced guide assemblies 104 for the trailing section of the saw band 96.

Since the guide assemblies 102 and 104 are the same structurally, except in that the supporting arms 106, 106 for the guide assemblies associated with the leading section of the saw band 96 are longer than the supporting arms 108, 108 for the guide assemblies associated with the trailing section of the saw band, a description of one such assembly is thought to be adequate for a description of all of such assemblies.

In FIG. 3, a bracket member 110, provided with a slot 112 in its end, is secured to the saw frame by welding or any other conventional method. The arms 106 and 108 are shaped to be slidably received in a slot 112. Arms 106 and 108 are also provided with a plurality of longitudinally spaced openings 114 (only one of which is shown in the drawings). Bracket member 110 is also provided with an opening 116 extending therethrough. Arm 106, or as the case may be arm 108, is adjusted relative to bracket member 110 until one of its longitudinally spaced openings 114 registers with opening 116. Bracket member 110 may be maintained in such adjusted position by a bolt, nut and washer arrangement 118 that cooperates with opening 116 and one of the longitudinally spaced openings 114 in arm 106.

At the opposite end of each of the arms 106 there is provided a saw guide assembly 102 and at the opposite end of each of the arms 108 there is provided a saw guide assembly 104. Since the guide assemblies 102 and 104 are similarly constructed, a description of one of the guide assemblies, such as 102, at the end of arm 106, is believed to be adequate as a description of all of the guide assemblies.

A U-shaped guide bracket 120 is secured to the end of an arm 106, opposite the end of the arm 106 having the plurality of longitudinally spaced openings 114, by a plate-like washer 122 and threaded bolt 124 that extends through opening 128 in the plate-like washer 122 and is threaded into a threaded opening 126 in the U-shaped bracket.

The opposite legs 130, 132 of the U-shaped guide bracket 120 are, respectively, provided with spaced aligned open circular recesses 134, 136. A plate member 138 is disposed between the inner walls 140, 142 of the U-shaped guide bracket 120. Plate member 138 is held secure between inner walls 140, 142 of the U-shaped guide bracket by a hex headed screw 144 which slidably passes through an opening (not illustrated) in leg 132 and is threadedly received in a threaded opening (not illustrated) in leg 130. Plate member 138 is provided at its ends with partial or opening ring elements 146, 148 which are nested, respectively, in circular recesses 134, 136 and are adapted to be rotatably adjusted therein upon loosening of hex headed screw 144 and secured in an adjusted position upon again tightening the hex headed screw 144.

A pair of guide rollers 150 and 152 are mounted closely adjacent each other on plate 138. Guide roller 150 is eccentrically mounted on an eccentric bearing 154 secured to one end of a shaft 158 by a nut or equivalent element 160. The other end of shaft 158 is threaded at 162 and secured in a threaded opening 164 located in plate member 138. Guide roller 152 is concentrically mounted on a bearing 166 secured to one end of a shaft 168 by a nut or equivalent element 170. The other end of shaft 168 is threaded at 172 and secured in a threaded opening 174 located in plate 138.

A saw band backing roller 176 is mounted on a bearing 178. Bearing 178 is supported on the end of a flat support arm 180 that is secured to plate member 138. The plate member 138 has an elongated slot 182 extending therethrough and through which the saw band backing roller 176 extends when support arm 180 is secured to plate 138 by hex headed screw 184 that passes through opening 186 in support arm 180 and is threaded into threaded opening 188.

Each of the axles 56, 60 and 64 for supporting, respectively, upper idler pulley 54, secondary idler pulley 58 and lower idler pulley 62 are mounted in bearings 190 that are adjustable in bearing supports 192. Thus, the adjustable mounting of the bearings for the several idler pulleys constitutes a take-up mechanism for the saw band 96. Adjustment of the bearings 190 relative to their supports 192 is effected by a screw means 194 threaded in the bearing supports 192 and connected to the bearings 190.

When it is desired to make a straight cut in a sheet of stock material, the stock material is placed so that the portable band saw may be moved by means of handles 90, 92 and 94 into the sheet of stock material. The band saw 10 may also be operated by maintaining the band saw in a fixed position and feeding the stock material to the band saw 10. Prior to either of such operations of the band saw 10, the front and rear traveling portions 98, 100 of the saw band 96 are adjusted by the saw guide assemblies 102, 104 so that they lie in a common plane. Thus, after the front traveling portion 98 of the saw band 96 has made a cut in the sheet of stock material, the rear traveling portion 100 enters into this cut and on continued movement of the band saw 10 into the stock material or the continued feeding tof the stock material to the endless saw band 96, the stock material so cut enters the space 14 which lies between the upper leg member 16 and the lower leg member 18.

Should it be desired to cut an arc or a circle in a sheet of stock material, the hex headed screw would be loosened thereby allowing the inner walls 140, 142 of the U-shaped guide bracket 120 to give sufficiently in order to allow the plate member 138 with its ring elements 146, 148 of the guide assemblies 102, 104 to be adjusted relative to the circular recesses 134, 136 until the downwardly or leading front portion 98 of the saw band 96 and the upwardly traveling rear portion 100 of the saw band 96 form an angle such that an arc or a circle of substantially any desired radius may be cut in a sheet of stock material.

FIG. 7 of the drawings shows how the band saw 10 described herein may be operated to cut along straight and curved paths, designated by the letters "a," "b," "c," and "d," to cut two sides of a rectangle in a sheet of stock material. It then shows the band saw 10 as beginning a cut "e" which corresponds with cut "a" and suggests how the band saw could be then operated to complete the cutting out of an entire rectangle from a sheet of stock material.

After reading the foregoing description, it will be apparent that the objects of the invention set forth initially have been successfully achieved.

What is claimed is:

1. A portable band saw comprising a frame member; an endless saw band; means to support said saw band for continuous movement on said frame and to provide front and rear planar portions that are normally positioned so that said planar portions lie in the same plane; means to adjust a section of said front planar portion of said saw band variable amounts so that said section may lie in a plane that extends at a predetermined angle to its normal plane and, when said portable band saw is moved into a sheet of stock, the section of said front planar portion of said saw band cuts an arc of predetermined radius in said sheet of stock; and means to adjust a section of said rear planar portion of said saw band variable amounts so that said rear planar portion lies in a plane that extends at an angle to its normal plane and corresponds with the first mentioned angle; whereby when said portable band saw is operated so as to make a cut in a sheet of stock either a straight or an arcuate cut is made in said stock depending on the angle at which said front portion of said saw band is set and the rear portion of said saw band enters into the cut made by the front portion of said saw band.

2. A portable band saw as defined in claim 1 wherein said frame is C-shaped with the legs of the C extending longitudinally and rearwardly a substantial distance beyond the rear portion of the saw band and forming a space therebetween, said space being unobstructed.

3. A portable band saw as defined in claim 1 wherein said means to support said saw band for continuous movement on said saw frame comprises a main idler pulley for supporting the upper loop of said continuous saw band located adjacent the upper end of said saw frame, a drive pulley adjacent the lower loop of said continuous saw band located adjacent the lower end of said saw frame, the axles of said main idler pulley and said drive pulley lying in substantially the same vertical plane, a first secondary idler pulley located adjacent but below said main idler pulley, a second secondary idler pulley located adjacent but above said drive pulley, the axles of said first and second secondary idler pulleys lying in the same vertical plane and positioning a section of the rear portion of the saw band closely adjacent the front portion of the saw band.

4. A portable band saw as defined in claim 1 wherein said means to adjust a section of said front portion of said saw band comprises pairs of longitudinally spaced roller guide means; each said roller guide means including a guide roller that engages one surface of the saw band and a guide roller that engages the other surface of said saw band.

5. A portable band saw as defined in claim 4 wherein the guide rollers of said guide roller means are mounted on a rotatably mounted plate.

6. A portable band saw as defined in claim 5 wherein said plate is provided with an arcuate supporting means that is received in an arcuate recess means formed in a U-shaped bracket.

7. A portable band saw as defined in claim 5 wherein said plate is provided with a pair of spaced arcuate supporting means that are received in a pair of spaced arcuate recesses formed in a U-shaped bracket.

8. A portable band saw as defined in claim 4 wherein at least one of said guide rollers is eccentrically mounted.

9. A portable band saw as defined in claim 1 wherein said means to adjust a section of said rear portion of said saw band comprises pairs of longitudinally spaced guide roller means, each said guide roller means including a guide roller that engages one surface of the saw band and a guide roller that engages the other surface of the saw band.

10. A portable band saw as defined in claim 1 wherein said means to adjust a section of said front portion of said saw band comprises pairs of longitudinally spaced roller guide means; each said roller guide means including a guide roller that engages one surface of the saw band and a guide roller that engages the other surface of said saw band; said means to adjust a section of said rear portion of said saw band comprises pairs of longitudinally spaced guide roller means, each said guide roller means including a guide roller that engages one surface of said saw band and a guide roller that engages the other surface of said saw band.

11. A portable band saw as defined in claim 10 wherein a rotatable means is provided in engagement with the rear edge of the front section of said saw band to limit backward movement of said front section of the saw band.

12. A portable band saw as defined in claim 11 wherein said rotatable means comprises a roller means.

13. A portable band saw as defined in claim 1 wherein said frame member includes axle supported wheel means at its forward end and a supporting guide wheel adjacent its rear end; the axle of said axle supported wheel means at said forward end of the frame lying in the same vertical plane as the leading portion of the saw band.

14. A portable band saw as defined in claim 1 wherein said frame is C-shaped with the legs of the C extending longitudinally and rearwardly a substantial distance beyond the rear portion of the saw band and forming a space therebetween, said space being unobstructed; said means to support said saw band for continuous movement on said saw frame comprises a main idler pulley for supporting the upper loop of said continuous saw band located adjacent the upper end of said saw frame, a drive pulley adjacent the lower loop of said continuous saw band located adjacent the lower end of said saw frame, the axles of said main idler pulley and said drive pulley lying in substantially the same vertical plane, a first secondary idler pulley located adjacent but below said main idler pulley, a second secondary idler pulley located adjacent but above said drive pulley, the axles of said first and second secondary idler pulleys lying in the same vertical plane and positioning a section of the rear portion of the saw band closely adjacent the front portion of the saw band; said means to adjust a section of said front portion of said saw band comprises pairs of longitudinal spaced roller guide means, each said roller guide means including a guide roller that engages one surface of the saw band and a guide roller that engages the other surface of said saw band; said means to adjust a section of said rear portion of said saw band comprises pairs of longitudinally spaced guide roller means, each said guide roller means including a guide roller that engages one surface of the saw band and a guide roller that engages the other surface of the saw band; and rotatable means in engagement with the rear edge of the front section of said saw band to limit backward movement of said front section of the saw band.

15. A portable band saw comprising frame means, pulley means mounted on said frame means for rotation about parallel axes, said pulley means being disposed in spaced relationship, an endless saw band trained about said pulley means, and adjustable guide means cooperating with said band to permit the alignment of front and rear portions thereof in an area between said pulley means for either straight or circular cuts.

* * * * *